United States Patent [19]  
Montgomery

[11] 4,227,025  
[45] Oct. 7, 1980

[54] REACTIVATION OF ARSENIC-POISONED NOBLE METAL CATALYST FOR REMOVAL OF ACETYLENE

[75] Inventor: Dean P. Montgomery, Bartlesville, Okla.

[73] Assignee: Phillips Petroleum Company, Bartlesville, Okla.

[21] Appl. No.: 11,743

[22] Filed: Feb. 13, 1979

[51] Int. Cl.³ .................................................. C07C 5/03
[52] U.S. Cl. .................................................... 585/259
[58] Field of Search ........................................ 585/259

[56] References Cited

U.S. PATENT DOCUMENTS

| | | | |
|---|---|---|---|
| 2,813,920 | 11/1957 | Cobb | 585/259 |
| 2,909,578 | 10/1959 | Andersen et al. | 585/259 |
| 2,927,141 | 3/1960 | Cohn | 585/259 |
| 3,549,720 | 12/1970 | Wright et al. | 585/259 |
| 3,670,041 | 6/1972 | Juhl et al. | 585/259 X |
| 3,775,506 | 11/1973 | Houston et al. | 585/259 |
| 3,839,483 | 10/1974 | Carr et al. | 585/259 |

FOREIGN PATENT DOCUMENTS 865299  4/1961  United Kingdom ..................... 585/259

OTHER PUBLICATIONS

Livingston, Chemical Engineering Progress, V69, No. 5, pp. 65–68 (1973).

Primary Examiner—Helen M. S. Sneed

[57] ABSTRACT

A noble metal hydrogenation catalyst suited for removal of acetylene by hydrogenating the same selectively as when it is in the presence of ethylene from which it is to be removed, e.g., palladium, which has been poisoned by arsenic is reactivated by purging the same with an arsenic-free gas, e.g., an arsenic-free ethylene containing acetylene together with hydrogen, in one embodiment at an elevated temperature, until substantial acetylene removal is occurring as one indication of restoration of activity and selectivity for removal of acetylene. The catalyst can then be employed for the selective removal of acetylene as from a gas containing it and ethylene.

5 Claims, No Drawings

REACTIVATION OF ARSENIC-POISONED NOBLE METAL CATALYST FOR REMOVAL OF ACETYLENE

This invention relates to the removal of acetylene from a gas containing the same. In one of its aspects, it relates to the selective removal of acetylene from a gas containing it, e.g., ethylene containing acetylene. In another of its aspects the invention relates to a process for catalytic and selective removal of acetylene from a gas, e.g., from ethylene containing acetylene in the presence of a hydrogenation catalyst such as a noble metal, e.g., palladium, by passing said gas together with hydrogen in the contact with said catalyst. In a further aspect, the invention relates to the treatment of such a gas to remove acetylene therefrom said gas also containing arsenic. In a further aspect still, the invention relates to the regeneration or reactivation of such a catalyst deactivated by arsenic so that it will substantially selectively hydrogenate acetylene from a gas containing it together with substantial quantities of ethylene.

In one of its concepts the invention provides a process for effectively removing acetylene from a gas containing the same together with small quantities of arsenic in the form of a gaseous compound thereof, said arsenic collecting in the catalyst and ultimately poisoning the same with regard to its activity as well as selectivity, which comprises feeding said gas together with hydrogen under acetylene removal conditions into contact with a hydrogenation catalyst, e.g., a noble metal catalyst such as palladium, until the activity of the catalyst for acetylene removal has been undesirably reduced, then purging the catalyst to remove the effect of arsenic therefrom by passing an arsenic-free gas together with hydrogen through the catalyst, in a now preferred form the gas purging the catalyst containing acetylene so that when activity and selectivity for removal of acetylene has been substantially restored the relative absence or substantial reduction of acetylene in the effluent from the catalyst being purged can be detected. In another of its concepts, the invention provides such a process as herein described wherein acetylene is removed from a gas containing it together with ethylene in the presence of a catalyst, e.g., palladium, the operation being commenced at a temperature at which acetylene removal will take place, the temperature being gradually increased to maintain activity of the catalyst, then when undesirable hydrogenation of ethylene is occuring together with the removal of acetylene, discontinuing the passing of the arsenic-containing gas feed to the catalyst and passing an arsenic-free feed to the catalyst together with hydrogen, said arsenic-free feed preferably containing acetylene so that when the activity of the catalyst has been substantially restored the reduction or elimination of acetylene in the effluent from the catalyst is detectable. In still a further concept of the invention, the temperature of the arsenic-free gas is reduced as needed as the catalyst is detected to have once again become reasonably active and selective for removal of acetylene.

In still another concept of the invention, there is provided a process herein described which is preeminently suited to the removal of acetylene from cracked gases obtained from conversion processes in which crude oils containing minor amounts of arsenic are thermally or catalytically cracked, hydrocracked or otherwise subjected to modification resulting in the production of gases containing arsenic.

It now appears that upon conversion of crude oils containing arsenic that the arsenic is converted to a gaseous compound of arsenic, very probably arsine, $AsH_3$, a volatile compound which easily accumulates in the volatile cracked products which include ethylene and even in an ethylene fraction separated from said products.

The presence of arsine or such a gaseous compound of arsenic as herein discussed in by-product ethylene is known as a problem. This problem bodes to become even more prevalent as ethylene producers find it necessary to rely on crude oil or heavy stocks derived therefrom as their ethylene source.

In the past, it has been the practice to return arsenic-poisoned palladium catalysts to the manufacturer for reprocessing, an inconvenient and expensive procedure. It has now been discovered that such catalysts can be regenerated in place by providing a purging step with an arsenic-free gas. This gas may be feed gas or any other gas which is inert to the catalyst. Such gases include fuel gas, light hydrocarbons, e.g., ethane, propane, and butane, hydrogen, nitrogen, carbon dioxide or even air providing suitable precautions are observed to avoid explosive mixtures of gases.

In Chemical Engineering Progress, Vol. 69, No. 5, May 1973, in an article entitled "Performance of Selective Hydrogenation Catalysts" reference is made to the removal of acetylene from $C_3$-minus feeds. In the article, the following paragraphs appear.

"The relatively poor performance of the noble metal catalyst in this application was not due so much to the presence of the heavier components as it was to undetected poisons, such as carbonyl sulfide. A later phase of the test program, during which the feed contained 3- to 5 parts/million vol. hydrogen sulfide, confirmed the effect of sulfur on the performance of the catalyst. With the increased sulfur content, the activity of the catalyst decreased, but responded to higher temperatures which were needed to return the apparent activity of the catalyst to the required performance level. Although the apparent activity could be increased by increasing temperature, it resulted in a decrease in selectivity, with subsequent loss of ethylene. When the hydrogen sulfide was removed from the feed, the original activity and selectivity of the catalyst were restored in a few hours.

This type of performance, a result of catalyst poisoning, was observed in two other plant tests at high and low pressures (hydrogen partial pressures were 40- and 15 lb./sq. in. abs.) in which the effect was so severe that the catalyst retained sufficient activity for only a few days' operation. The poisoning in these plants has since been attributed to arsenic which was later found in the feed."

It has been noted in the foregoing, substantially quoted from the article, that there was a recognition of arsenic poisoning in those instances in which the ". . . effect was so severe that the catalyst retains sufficient activity for only a few days operation."

It is also noted that the rising of the temperature increased the "apparent" activity. Thus, there was ". . . a decrease of selectivity, with subsequent loss of ethylene."

I have now found that the activity and selectivity of an arsenic poisoned noble metal catalyst can be regularly and substantially restored by passing an arsenic-free containing gas together with hydrogen through the catalyst while raising the temperature of the catalyst and continuing to pass the said gas at said elevated temperature through the catalyst until its activity as well as selectivity have been restored, as noted herein. While there is a loss of some ethylene when the catalyst is again used to remove acetylene it is not prohibitive and the final gas composition contains virtually zero acetylene.

It is an object of the invention to provide an improved process for the removal of acetylene from a gas containing the same. It is another object of the invention to provide a process for the removal of acetylene from a gas containing it together with ethylene. It is a further object of the invention to provide a process for the removal of acetylene from a gas containing the same by hydrogenation of the acetylene in the presence of a hydrogenation catalyst. It is a further object of the invention to provide a process for removal of acetylene from a gas containing it by selectively hydrogenating the acetylene as it is carried in a desired gas, e.g., ethylene. It is another object of the invention to provide a process for the reactivation of an arsenic-poisoned acetylene removal hydrogenation catalyst.

Other aspects, objects, concepts, and the several advantages of the invention are apparent from a study of this disclosure and the appended claims.

According to the invention there is provided a process for the effective removal of acetylene from a first gas feed containing the same together with small quantities of arsenic in the form of a gaseous compound thereof which comprises feeding said gas together with hydrogen at an acetylene removal temperature into contact with a noble metal hydrogenation catalyst, wherein the activity of the catalyst falls off due to arsenic poisoning thereof, the steps which comprise discontinuing the feeding of said first gas together with hydrogen when activity of the catalyst has been reduced, feeding a second, arsenic-free gas together with hydrogen into contact with said catalyst, elevating gradually the temperature of the catalyst until this activity is substantially restored and then discontinuing the feeding of said second gas and then resuming the feeding of said first gas and hydrogen to the catalyst.

The invention is particularly applicable to the removal of acetylene from a gaseous stream of ethylene in which, as known, acetylene is undesirable. Thus, the invention is preeminently suited to the removal of acetylene from ethylene which is recovered from a hydrocarbon oil conversion product.

In its now preferred form, the gas used for reactivation of the catalyst will be an arsenic-free ethylene gas containing hydrogen and acetylene. By using such a gas it is possible to monitor and to detect the return of activity and selectivity for removal of acetylene of the catalyst. It is possible when detecting that activity has been substantially restored to cut back on the temperature of the purge or sweep gas so as to avoid any undesired rise in temperature and thereby undesired conversion by hydrogenation of ethylene to ethane.

The purging step can be carried out at any convenient pressure, from about atmospheric to 600 psig or more. Purging temperature may vary from ambient to 600° F. or even higher, if desired, but a purging temperature of 100°–500° F. is preferred. Purging time will depend on the degree of catalyst poisoning and the purge conditions, but a purge time of from about 2 hours to 4 days is preferred. These conditions are given generally as applicable to noble metal hydrogenation catalysts. For any given catalyst, e.g., platinum, etc., the operator can determine optimum temperature.

The now preferred catalyst is a palladium-type hydrogenation catalyst e.g., palladium on alumina, which is selective for the hydrogenation of acetylene to ethylene in the presence of ethylene. However, one skilled in the art in possession of this disclosure having studied the same will understand that the method is applicable to any noble metal hydrogenation catalyst which is selective for the hydrogenation of acetylene to ethylene in the presence of ethylene.

As is known the temperature of an acetylene removal operation is gradually increased to maintain a desirable removal of acetylene. However, there is a limit beyond which undue conversion of ethylene to ethane begins to take place. Accordingly, the invention is best practiced whenever the catalyst appears to have been poisoned to such an extent that raising the temperature to obtain the removal of acetylene results also in the excessive hydrogenation of ethylene to ethane.

EXAMPLE

Two identical catalyst bed trains, each train consisting of two one-inch ID × 8.75-inch long beds operating in series, were charged with United G-83 (palladium on alumina) ⅛-inch catalyst pellets (United Catalyst Corp., Louisville, KY). Each bed contained 25 cc of catalyst supported on glass beads. The trains were each operated at a gas hourly space velocity of 7000 and a pressure of 525 psig to remove acetylene from a feed gas of the approximate composition:

|  | Volume |
| --- | --- |
| Hydrogen | 24 |
| Nitrogen | 40.5 |
| Ethylene | 35 |
| Carbon Monoxide | 0.3 |
| Acetylene | 2200–3000 ppmw |
| Ethane | 190 ppmw |

One train, termed the experimental train, was additionally fed a methane-arsine mixture to add the equivalent of 16 ppbw arsine to the combined feed to study the effect of arsenic poisoning under comparative conditions.

It was found that the effect of arsenic poisoning could be overcome by raising reactor temperature about 0.0153° F. per hour or about 1° F. every three days. Some of these data are displayed in Table I. The data were obtained over a period of days.

TABLE I

| | | Temperature, ° F. | | | Reference Beds | | | | | | Experimental Beds | | | | | |
| | | Reference Beds | | Experimental Beds | | Intermediate Comp.* | | | Final Composition | | | Intermediate Comp. | | | Final Composition | | |
| Date | Time | In | Out | In | Out | $C_2^=$ | $C_2$ | $C_1$ | $C_2^=$ | $C_2$ | $C_1$ | $C_2^=$ | $C_2$ | $C_1$ | $C_2^=$ | $C_2$ | $C_1$ |
| 6/28 | 0800 | 149 | 162 | 149 | 161 | 271 | 396 | 20 | 0 | 1175 | 17 | 578 | 313 | 132 | 0 | 1092 | 130 |
| | 1600 | 149 | 164 | 149 | 163 | 552 | 374 | 23 | 31 | 1034 | 17 | 1058 | 316 | 131 | 53 | 955 | 107 |

TABLE I-continued

| | | Temperature, °F. | | | | Reference Beds | | | | | | Experimental Beds | | | | | |
|---|---|---|---|---|---|---|---|---|---|---|---|---|---|---|---|---|---|
| | | Reference Beds | | Experimental Beds | | Intermediate Comp.* | | | Final Composition | | | Intermediate Comp. | | | Final Composition | | |
| Date | Time | In | Out | In | Out | $C_2^=$ | $C_2$ | $C_1$ | $C_2^=$ | $C_2$ | $C_1$ | $C_2^=$ | $C_2$ | $C_1$ | $C_2^=$ | $C_2$ | $C_1$ |
| 6/29 | 1200 | 150 | 166 | 150 | 165 | 365 | 1286 | 21 | 0 | 1272 | 24 | 545 | 1034 | 30 | 0 | 1267 | 30 |
| | 2000 | 149 | 162 | 149 | 161 | 503 | 395 | 20 | 0 | 1018 | 25 | 747 | 331 | 143 | 22 | 992 | 149 |
| 6/30 | 0400 | 150 | 164 | 150 | 163 | 493 | 369 | 16 | 0 | 1059 | 18 | 675 | 319 | 104 | 0 | 1011 | 109 |
| | 1200 | 149 | 163 | 149 | 162 | 559 | 350 | 18 | 24 | 928 | 19 | 798 | 299 | 117 | 32 | 879 | 118 |
| 7/01 | 0000 | 146 | 158 | 146 | 157 | 869 | 295 | 25 | 85 | 704 | 21 | 1105 | 264 | 114 | 107 | 661 | 114 |
| | 1600 | 151 | 163 | 151 | 161 | 746 | 306 | 16 | 51 | 772 | 17 | 992 | 291 | 119 | 71 | 717 | 125 |
| 7/02 | 0000 | 151 | 165 | 151 | 164 | 433 | 319 | 18 | 0 | 1016 | 21 | 643 | 323 | 97 | 0 | 940 | 96 |
| | 1200 | 151 | 164 | 151 | 163 | 610 | 341 | 24 | 30 | 853 | 18 | 857 | 293 | 111 | 46 | 783 | 122 |
| | 1700 | 140 | 150 | | | 1012 | 277 | 24 | 272 | 511 | 24 | Bed Slugged with AsH₃ @ 1345, Reaction Lost | | | | | |
| 7/07 | 0800 | 134 | 138 | | | 1533 | 238 | 18 | 764 | 310 | 19 | Operation Discontinued for 4 Days. | | | | | |
| | 1900 | 145 | 153 | | | 1151 | 271 | 24 | 177 | 516 | 30 | | | | | | |
| 7/08 | 0800 | 155 | 166 | | | 263 | 447 | 14 | 0 | 1100 | 19 | | | | | | |
| | 1300 | 160 | 176 | | | 113 | 607 | 18 | 0 | 1483 | 22 | | | | | | |
| | 2300 | 171 | 189 | | | 0 | 1002 | 30 | 0 | 2334 | 19 | | | | | | |
| 7/09 | 0900 | 180 | 197 | | | 0 | 1625 | 18 | 0 | 3298 | 25 | | | | | | |
| | 1330 | 185 | 207 | 185 | 197 | 0 | 2029 | 22 | 0 | 3836 | 15 | 748 | 401 | 24 | 14 | 1162 | 27 |
| | 1700 | 189 | | 189 | 203 | 0 | 2501 | 22 | 0 | 4523 | 17 | 193 | 753 | 17 | 0 | 1551 | 24 |

*All compositions are ppmw

The run was interrupted by the slugging of the experimental train with the equivalent of 6590 hours of poisoning in 30 minutes.

Following a 4-day shutdown operation of both trains was resumed with arsine-free feed. Reactor inlet temperatures were gradually increased from 134° to 185° F. over a period of three days. Inlet temperatures for the experimental beds were the same as those of the reference beds since all beds were in the same heating bath.

The acetylene concentration in the effluent of the reference beds reached zero at about 155° F. inlet temperature. As the inlet temperature was further increased more ethylene was converted to ethane in the unpoisoned train. As the inlet temperature was further increased to 185° F., good activity was found in the earlier poisoned experimental bed. This result demonstrates that the 3 days of purging of this bed with arsenic-free feed restored both the activity and selectivity of the catalyst.

As the inlet temperature was further increased from 185° to 189° F., acetylene concentration in the effluent of the experimental train dropped from 14 ppmw to zero. Thus, the difference in activity of the two trains was now overcome by an inlet temperature increase of only about 38° F. (from 151° F. before arsene slugging to 189° F.), which compares with a calculated requirement of at least a 100° F. temperature increase (to about 250° F.) based on the previously determined rate of activity loss when operating on 16 ppbw arsine-containing feed.

Reasonable variation and modification are possible in the scope of the foregoing disclosure and the appended claims to the invention the essence of which is that an arsenic-poisoned hydrogenation catalyst, suitable for the selective hydrogenation of acetylene in the presence of say, ethylene, is purged with an arsenic-free gas and hydrogen to remove arsenic from the catalyst and thus to restore not only its activity but also its selectivity for desirably removing acetylene from, say, ethylene.

I claim:

1. In a process for the effective removal of acetylene from a first gas feed containing the same, together with small quantities of arsenic in the form of a gaseous compound thereof, which comprises feeding said gas together with hydrogen at an acetylene removal temperature in contact with a noble metal hydrogenation catalyst, wherein the activity of the catalyst falls off due to arsenic poisoning thereof, the steps which comprise discontinuing the feeding of said first gas when activity of the catalyst has been reduced, feeding a second arsenic-free acid together with hydrogen into contact with said catalyst to effect a purging operation, elevating gradually the temperature of the catalyst until its activity is substantially restored, then discontinuing the feeding of said second gas and then resuming feeding of said first gas and hydrogen to the catalyst.

2. A process according to claim 1 wherein feeding of said first gas and hydrogen to the catalyst is resumed.

3. A process according to claim 1 wherein the first gas also contains ethylene in substantial portions, and the acetylene is selectively removed by hydrogenation.

4. A process according to claim 2 wherein the catalyst is palladium, the first gas is obtained from a crude oil containing arsenic which is then present in said first gas as a volatile arsenic compound and said second or arsenic-free gas is an ethylene-containing gas derived from another or arsenic-free source.

5. A process according to claim 4 wherein the temperature of the catalyst during the purging operation is in the approximate range of from about ambient to about 600° F., the arsenic-free gas also contains acetylene, and the purging is continued until the activity of the catalyst has been desirably restored as indicated by the removal of acetylene from the purged gas.

* * * * *

UNITED STATES PATENT AND TRADEMARK OFFICE
CERTIFICATE OF CORRECTION

PATENT NO. : 4,227,025

DATED : October 7, 1980

INVENTOR(S) : Dean P. Montgomery

It is certified that error appears in the above-identified patent and that said Letters Patent are hereby corrected as shown below:

In column 6, line 35 of the patent the word "acid" should be --- gas ---.

Signed and Sealed this

Third Day of March 1981

[SEAL]

Attest:

RENE D. TEGTMEYER

Attesting Officer

Acting Commissioner of Patents and Trademarks